(12) United States Patent
Rudrapatna et al.

(10) Patent No.: US 9,038,395 B2
(45) Date of Patent: May 26, 2015

(54) COMBUSTORS WITH QUENCH INSERTS

(75) Inventors: Nagaraja S. Rudrapatna, Chandler, AZ (US); Philip Smalley, Tempe, AZ (US); Lowell Frye, Chandler, AZ (US); William Landram, Glendale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 403 days.

(21) Appl. No.: 13/434,618

(22) Filed: Mar. 29, 2012

(65) Prior Publication Data
US 2013/0255265 A1    Oct. 3, 2013

(51) Int. Cl.
*F23R 3/06* (2006.01)
*F23R 3/16* (2006.01)

(52) U.S. Cl.
CPC ... *F23R 3/06* (2013.01); *F23R 3/16* (2013.01); *F23R 2900/00017* (2013.01); *F23R 2900/00018* (2013.01); *Y02T 50/675* (2013.01)

(58) Field of Classification Search
CPC ............ F23R 3/002; F23R 3/045; F23R 3/06; F23R 3/04; F23R 3/60; F23R 3/10; F23R 3/16
USPC .............................. 60/752, 754–760, 798, 796
See application file for complete search history.

(56) References Cited

U.S. PATENT DOCUMENTS

| | | | |
|---|---|---|---|
| 4,302,941 A | 12/1981 | DuBell | |
| 4,527,397 A | 7/1985 | Tobery et al. | |
| 4,628,694 A | 12/1986 | Kelm et al. | |
| 4,643,781 A | 2/1987 | Vickers et al. | |
| 4,653,279 A | 3/1987 | Reynolds | |
| 4,695,247 A | 9/1987 | Enzaki et al. | |
| 4,700,544 A | 10/1987 | Fucci | |
| 4,875,339 A | 10/1989 | Rasmussen et al. | |
| 5,277,021 A | 1/1994 | Shekleton | |
| 5,289,686 A | 3/1994 | Razdan et al. | |
| 5,472,339 A | 12/1995 | Rakowski et al. | |
| 5,687,572 A | 11/1997 | Schrantz et al. | |
| 5,746,048 A | 5/1998 | Shah | |
| 6,170,266 B1 | 1/2001 | Pidcock et al. | |
| 6,351,949 B1 * | 3/2002 | Rice et al. | 60/752 |
| 6,408,628 B1 | 6/2002 | Pidcock et al. | |

(Continued)

FOREIGN PATENT DOCUMENTS

| | | |
|---|---|---|
| EP | 2189721 A2 | 5/2010 |
| EP | 2224168 A2 | 9/2010 |

(Continued)

OTHER PUBLICATIONS

EP Communication, EP 13 159 067.1-1605 dated Oct. 4, 2014.

(Continued)

*Primary Examiner* — Andrew Nguyen
(74) *Attorney, Agent, or Firm* — Ingrassia Fisher & Lorenz, P.C.

(57) ABSTRACT

A combustor for a turbine engine is provided. The combustor includes a first liner and a second liner forming a combustion chamber with the first liner, the combustion chamber configured to receive an air-fuel mixture for combustion therein. The first liner defining an air admission hole for directing a first jet of pressurized air into the combustion chamber, and the air admission hole may have a non-circular shape. The combustor further includes an insert positioned within the air admission hole to guide the first jet through the air admission hole and into the combustion chamber.

13 Claims, 9 Drawing Sheets

(56) References Cited

U.S. PATENT DOCUMENTS

| | | | |
|---|---|---|---|
| 6,668,559 B2 * | 12/2003 | Calvez et al. | 60/796 |
| 7,000,396 B1 | 2/2006 | Storey | |
| 7,000,397 B2 | 2/2006 | Pidcock et al. | |
| 7,036,316 B2 | 5/2006 | Howell et al. | |
| 7,059,133 B2 | 6/2006 | Gerendas | |
| 2009/0120095 A1 | 5/2009 | Berry et al. | |
| 2010/0095679 A1 | 4/2010 | Rudrapatna et al. | |
| 2010/0122537 A1 | 5/2010 | Yankowich et al. | |
| 2010/0218504 A1 | 9/2010 | Bronson et al. | |
| 2011/0219774 A1 | 9/2011 | Bronson et al. | |
| 2012/0017596 A1 * | 1/2012 | Rudrapatna et al. | 60/752 |

FOREIGN PATENT DOCUMENTS

| | | |
|---|---|---|
| EP | 2413036 A2 | 2/2012 |
| GB | 2353589 A | 2/2001 |

OTHER PUBLICATIONS

Nagaraja S. Rudrapatna, et al.; Combustors With Quench Inserts, U.S. Appl. No. 12/843,750.

Paul Yankowich, et al.; Combustors With Inserts Between Dual Wall Liners, U.S. Appl. No. 12/275,050.

EP Search Report, EP 13159067.1-1605/2644996 dated Mar. 27, 2014.

EP Examination Report for Application No. 13149067.1 dated Dec. 22, 2014.

* cited by examiner

COMBUSTORS WITH QUENCH INSERTS

TECHNICAL FIELD

The following discussion generally relates to gas turbine engine combustors, and more particularly, to combustors with quench inserts and methods for installing the same.

BACKGROUND

Gas turbine engines, such as those used to power modern commercial aircraft, typically include a compressor for pressurizing a supply of air, a combustor for burning fuel in the presence of the pressurized air, and a turbine for extracting energy from the resultant combustion gases. The combustor typically includes radially spaced apart inner and outer liners. The inner and outer liners generally define an annular combustion chamber between the compressor and the turbine. A number of circumferentially distributed fuel injectors typically project into the forward end of the combustion chamber and supply the fuel to the combustion chamber, and one or more rows of circumferentially distributed air admission holes in the liners admit air into the combustion chamber for combustion.

Modern combustors generally attempt to operate at very high temperatures, to achieve high operability, and to produce relatively low gaseous pollutant emissions during combustion, particularly oxides of nitrogen (NOx). One type of combustor that may provide one or more of these advantages is a rich burn, quick quench, lean burn (RQL) combustor, which includes the following three serially-arranged combustion zones: a rich burn zone at the forward end of the combustor, a quench or dilution zone downstream of the rich burn zone, and a lean burn zone downstream of the quench zone. By precisely controlling the stoichiometries between the air and fuel in each zone, high-temperature excursions can be reduced and the resulting NOx emissions can be minimized. The design and development of the quench zone geometry is one of the primary challenges in the successful implementation of low-emissions RQL combustors.

Accordingly, it is desirable to provide RQL combustors with a geometry that promotes low NOx emissions, increased operability, and high durability. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a turbine engine is provided. The combustor includes a first liner and a second liner forming a combustion chamber with the first liner, the combustion chamber configured to receive an air-fuel mixture for combustion therein. The first liner defining an air admission hole for directing a first jet of pressurized air into the combustion chamber, and the air admission hole may have a non-circular shape. The combustor further includes an insert positioned within the air admission hole to guide the first jet through the air admission hole and into the combustion chamber In accordance with another exemplary embodiment, a method is provided for installing an insert in an air admission hole of a combustor liner. The insert includes a body portion, a shoulder, and an inlet portion and the combustor liner having a liner wall with a first side and a second side. The method includes inserting the inlet portion through the air admission hole from the first side to the second side until the shoulder abuts the hot side, wherein the air admission hole has a generally non-circular shape; and deforming the inlet portion such that the inlet portion has an outer diameter greater than a diameter of the air admission hole

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Exemplary embodiments described herein provide a combustor having single-walled or dual-walled liners with an insert positioned within air admission holes to guide pressurized air through the liner and into the combustion chamber. The air admission holes and/or inserts may have anti-rotation features, such as non-circular shapes, to prevent rotation of the respective insert within the hole. During installation, each insert generally includes a tubular body portion that is inserted from the hot side through the liner until a shoulder circumscribing the body portion abuts the hot side. A tool then deforms an inlet portion projecting through the cold side to form a flared inlet portion. In some embodiments, the deformation step may swage the dimensions of the insert into the dimensions of the air admission hole. The flared inlet portion and shoulder capture the liner to retain the insert relative to the liner without welding or other bonding techniques.

Figure 1:
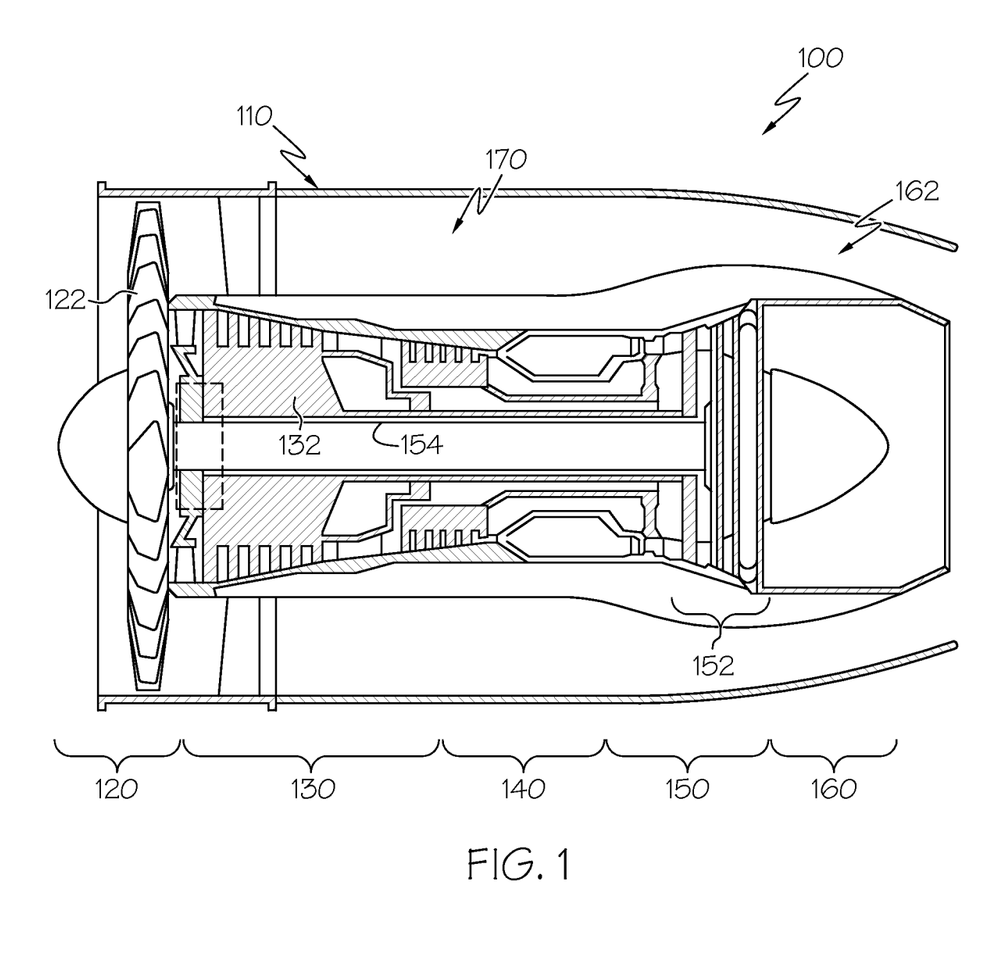
FIG. 1 is a cross-sectional view of a gas turbine engine in accordance with an exemplary embodiment.

FIG. 1 is a simplified, cross-sectional view of a gas turbine engine 100 according to an embodiment. The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132 that raise the pressure of the air directed from the fan 122. The compressors 132 then direct the compressed air into the combustion section 140. In the combustion section 140, the high pressure air is mixed with fuel and combusted. The combusted air is then directed into the turbine section 150.

The turbine section 150 may include a series of turbines 152, which may be disposed in axial flow series. The combusted air from the combustion section 140 expands through and rotates the turbines 152 prior to being exhausted through a propulsion nozzle 162 disposed in the exhaust section 160. In one embodiment, the turbines 152 rotate to drive equipment in the engine 100 via concentrically disposed shafts or spools. Specifically, the turbines 152 may drive the compressors 132 via one or more rotors 154.

Figure 2:
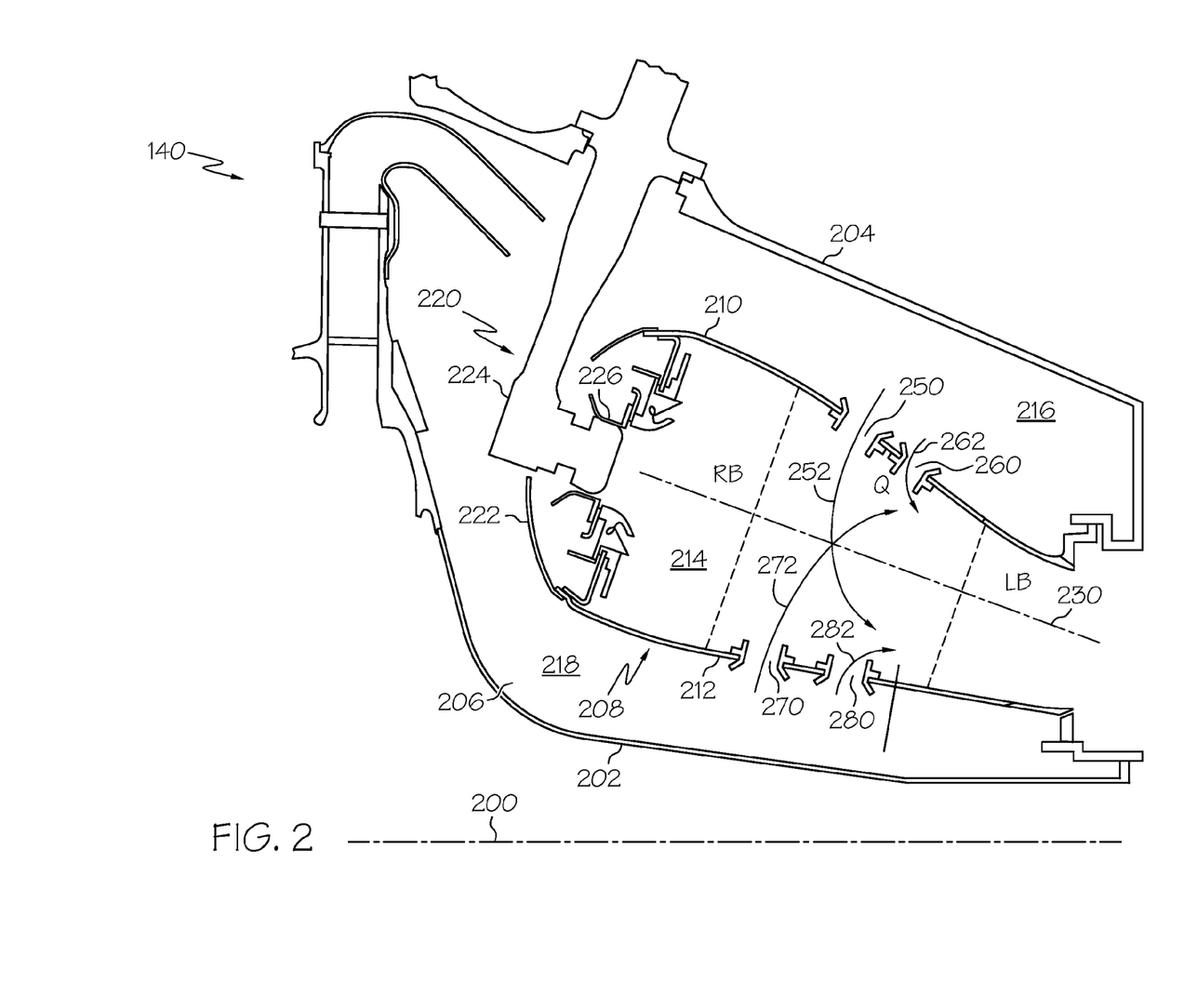
FIG. 2 is a partial, cross-sectional side elevation view of a combustor section of the engine of FIG. 1 in accordance with an exemplary embodiment.

FIG. 2 is a more detailed cross-sectional view of the combustion section 140 of FIG. 1. In FIG. 2, only half the cross-sectional view is shown; the other half would be substantially rotationally symmetric about a centerline and axis of rotation 200. The combustion section 140 of FIG. 2 is an annular combustion section 140, although aspects of exemplary embodiments described herein may also be useful in can combustors, can-annular combustors, and other types of combustors. Moreover, exemplary embodiments may find beneficial uses in many industries, including aerospace and particularly in high performance aircraft, as well as automotive and electrical generation.

The combustion section 140 includes a radially inner case 202 and a radially outer case 204 concentrically arranged with respect to the inner case 202. The inner and outer cases 202, 204 circumscribe the axially extending engine centerline 200 to define an annular pressure vessel 206. The combustion section 140 also includes a combustor 208 residing within the annular pressure vessel 206. The combustor 208 is defined by an outer liner 210 and an inner liner 212 that is circumscribed by the outer liner 210 to define an annular combustion chamber 214. The liners 210, 212 cooperate with cases 202, 204 to define respective outer and inner air plenums 216, 218.

The combustor 208 includes a front end assembly 220 comprising a dome assembly 222, fuel injectors 224, and fuel injector guides 226. One fuel injector 224 and one fuel injector guide 226 are shown in the partial cross-sectional view of FIG. 2. In one embodiment, the combustor 208 includes a total of sixteen circumferentially distributed fuel injectors 224, but it will be appreciated that the combustor 208 could be implemented with more or less than this number of fuel injectors 224. Each fuel injector 224 introduces a swirling, intimately blended fuel-air mixture that supports combustion in the combustion chamber 214.

The depicted combustor 208 is a rich burn, quick quench, lean burn (RQL) combustor. During operation, a portion of the pressurized air enters a rich burn zone RB of the combustion chamber 214 by way of passages in the front end assembly 220. This air is referred to as primary combustion air because it intermixes with a stoichiometrically excessive quantity of fuel introduced through the fuel injectors 224 to support initial combustion in the rich burn zone RB. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

The combustion products from the rich burn zone RB, which include unburned fuel, then enter a quench zone Q. Jets 252, 262 flow from the plenum 216 into the quench zone Q through air admission (or quench) holes 250, 260, respectively, in the outer liner 210. Similarly, jets 272, 282 flow from the plenum 218 into the quench zone Q through air admission (or quench) holes 270, 280, respectively, in the inner liner 212. Additional holes with similar features and arrangements may be provided in both the outer and inner liners 210, 212 to provide additional quench jets to the combustion chamber 214. The air admission holes 250, 260, 270, 280 in the outer and inner liners 210, 212 are discussed in further detail below with reference to FIGS. 3-13.

The jets 252, 262, 272, 282 are individually and collectively referred to as quench air jets because they rapidly mix the combustion products from a stoichiometrically rich state at the forward edge of the quench zone Q to a stoichiometrically lean state at, or immediately downstream of, the aft edge of the quench zone Q. The quench air rapidly mixes with the combustion products entering the quench zone Q to support further combustion and release additional energy from the fuel. Since thermal NOx formation is a strongly related to time-at-temperature, it is important that the fuel-rich mixture passing through the quench zone be mixed rapidly and thoroughly to a fuel-lean state in order to avoid excessive NOx generation. Thus, the design of the quench air jet arrangement in an RQL combustor is important to the successful reduction of NOx levels.

Finally, the combustion products from the quench zone Q enter a lean burn zone LB where the combustion process concludes. As the combustion products flow into the lean burn zone LB, the air jets 252, 262, 272, 282 are swept downstream and also continue to penetrate radially and spread out laterally and intermix thoroughly with the combustion gases and any remaining combustion products.

Figure 3:
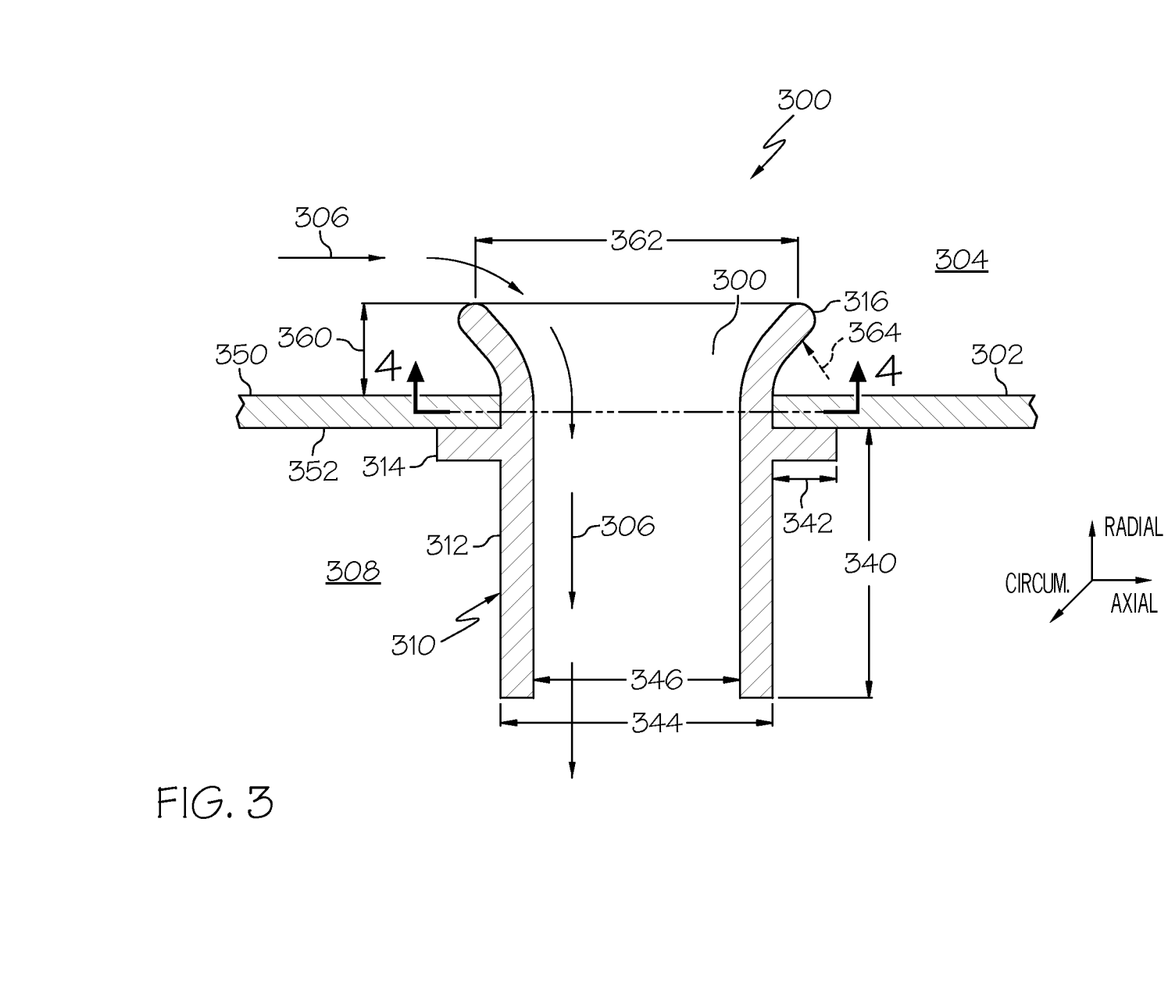
FIG. 3 is an enlarged portion of the combustor section of FIG. 2 in accordance with an exemplary embodiment.

FIG. 3 is a cross-sectional view of an exemplary air admission hole 300 formed in a combustor liner 302 (e.g., in the outer or inner liner 210, 212 of the combustor 208 of FIG. 2). In general, the air admission hole 300 may be formed in an inner or outer liner, e.g., the air admission hole 300 discussed above. As such, FIG. 3 depicts the air admission hole 300 extending through the liner 302 between a plenum 304 (e.g., plenum 216 or 218 of FIG. 2) and a combustion chamber 308 (e.g., chamber 214 of FIG. 2).

In the exemplary embodiment depicted in FIG. 3, an insert 310 is arranged in the air admission hole 300 to guide the jets 306 from the plenum 304, through the air admission hole 300, and into the combustion chamber 308. Particularly, the plunged characteristics of the insert 310 assist the jets 306 in penetrating to the desired depth within the combustion chamber 308 for advantageous quench characteristics. Moreover, in one exemplary embodiment, the liner 302 has effusion holes (not shown) that provide a cooling layer of air on the combustor side of the combustion chamber 308. In some exemplary embodiments, the insert 310 decreases or eliminates any interference between the jet 306 and the effusion cooling layer.

As shown, the liner 302 is a single-walled liner with a cold side 350 that faces the plenum 304 and a hot side 352 that faces the combustion chamber 308. In the embodiment shown in FIG. 3, the insert 310 is formed from a single, discrete piece relative to the liner 302. The insert 310 includes a body portion 312 that extends through the liner 302 and into the combustion chamber 308. The body portion 312 is generally tubular and assists in guiding the jet 306 into the combustion chamber 308. A shoulder 314 circumscribes the body portion 312 and abuts the hot side 352 of the liner 302. The shoulder 314 generally extends in an axial direction to prevent the insert 310 from sliding out of the liner 302 in a radial direction towards the plenum 304. In one exemplary embodiment, the shoulder 314 may be contoured in the axial-circumferential plane to locally match any contour of the hot side 352. An inlet portion 316 extends in a radial direction from the body portion 312 and is flared or bell-shaped to guide the jet 306 into the insert 310. The flared geometry of the inlet portion 316 serves to secure the insert 310 in the radial direction towards the combustion chamber 308 by abutting the cold side 350 of the liner 302. In effect, the inlet portion 316 and shoulder 314 function to capture the liner 302 therebetween and to retain the insert 310, particularly in the radial direction, i.e., the inlet portion 316 and shoulder 314 prevent the insert 310 from sliding out of the air admission hole 300 into the plenum 304 or into the combustion chamber 308.

Consequently, the insert 310 generally does not require additional securement to the liner 302 in the form of bonding, welding and/or additional components or processing steps. As such, the insert 310 may be strain isolated with respect to both the cold side 350 and the hot side 352 in each of the radial, axial and circumferential directions to accommodate thermal expansion and reduction differences.

The dimensions of the insert 310 may vary as necessary or desired. For example, the body portion 312 may extend into the combustion chamber 308 to any suitable depth 340 with considerations for desired jet penetration and effusion cooling impact. The body portion 312 generally has an outer diameter 344 that approximates the diameter of the air admission hole 300 in the liner 302 for a secure fit and leakage minimization. The inner diameter 346 of the body portion 312 may depend on aerodynamic, fluid dynamic, and other operational and installation characteristics. For example, the inner diameter 346 may depend on the desired quantity of air passing through the air admission hole 300. Additional details about the cross-sectional shapes of the insert 310 and/or air admission hole 300 are provided below. The shoulder 314 may extend to a length 342 that is greater than the diameter 344 of the air admission hole 300 without unduly interfering with operational and/or cooling performance. The inlet portion 316 may have a height 360, diameter 362, and curvature 364 for optimally guiding the jet 306 into the insert 310. Generally, the curvature 364 exhibits a changing radius of curvature (e.g., elliptical). In other embodiments, the curvature 364 may have a constant radius of curvature or have straight sections. In general, based on the configuration of the insert 310, the temperature profile of the combustion gases can be adjusted without compromising fuel-air mixing, which could lead to elevated levels of NOx.

Additional exemplary dimensions and design considerations will now be provided. As one example, the amount of air flow forming the jet 306 may be based on the overall aerodynamic design of the combustor. The outer diameter 344 of the body portion 312 may be, for example, in the range of about 0.06-0.1 inches larger than the inner diameter 346 and the inner diameter 346 may be, for example, in the range of about 0.1-0.4 inches, although any suitable sizes may be provided. As noted above, the depth 340 may extend from the hot side 352 beyond the effusion cooling layer, such as, for example, in the range of about 0.075-0.15 inches. The length 342 of shoulder 314 may extend to any extent that prevents the insert from sliding through the air admission hole 300, such as, for example, in the range of about 0.02-0.03 inches. The inlet height 360, inlet diameter 362, and curvature 364 may generally be related to one another by CFD modeling. For example, each relative diameter 362 through the inlet portion 316 may be associated with a height 360 based on a predetermined relationship (e.g., a polynomial equation) that results in the curved inlet shape. As noted above, such an equation may be modeled based on various combinations of heights and diameters. One such suitable equation may generally be considered an elliptical shape. In one exemplary embodiment, the inlet portion 316 is designed such that the jet 306 makes a smooth transition into the insert 310, without unnecessary turbulence, pressure loss, or flow separations.

As will be discussed in greater detail below, the air admission hole 300 and/or insert 310 have anti-rotation features that impede or prevent rotation of the insert 310 within the air admission hole 300 (e.g., rotation about a radial axis of the air admission hole 300). For example, the air admission hole 300 and/or insert 310 may be non-circular shapes, including rectangular, racetrack, oval, and square such that rotation is prevented or mitigated.

FIGS. 4-7 are examples of various embodiments of air admission holes 300 and inserts 310 with anti-rotation features. In general, the cross-sectional views of FIGS. 4-8 correspond to the view through line 4-4 in FIG. 3.

Figure 4:
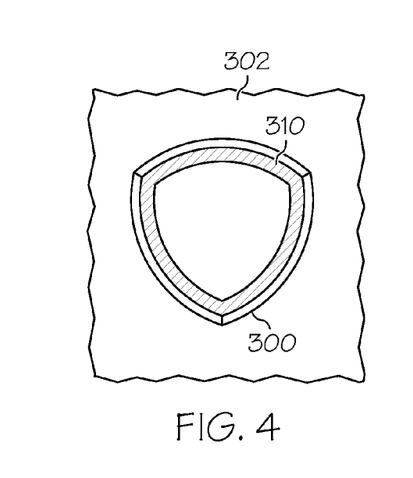
FIG. 4 is a cross-sectional view of a portion of the combustor section of FIG. 3 through line 4-4 in accordance with an exemplary embodiment.

In the embodiment of FIG. 4, the air admission hole 300 and insert 310 have tri-lobed shapes in the circumferential-axial plane of the liner 302. In other words, the shapes of air admission hole 300 and insert 310 may each include a plurality (e.g., three) generally convex segments that join adjacent segments at generally convex vertices. In other embodiments, the air admission hole 300 and/or insert 310 may have generally concave vertices or more than three convex segments.

Figure 5:
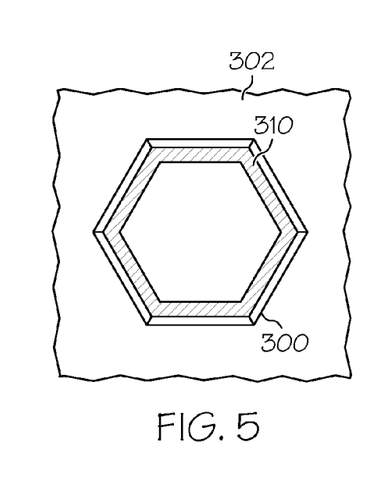
FIG. 5 is a cross-sectional view of a portion of the combustor section of FIG. 3 through line 4-4 in accordance with another exemplary embodiment.

In the embodiment shown in FIG. 5, the air admission hole 300 and insert 310 have six-lobed (or hexagonal) shapes in which six convex or straight segments are joined at angled or curved convex vertices. In the embodiment shown in FIG. 6, the air admission hole 300 and insert 310 may have multi-lobed (or knurled) shapes in which numerous convex or straight segments are joined at angled or curved concave vertices.

Figure 6:
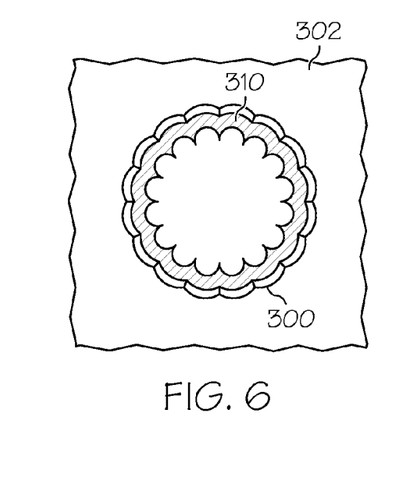
FIG. 6 is a cross-sectional view of a portion of the combustor section of FIG. 3 through line 4-4 in accordance with a further exemplary embodiment.
Figure 7:
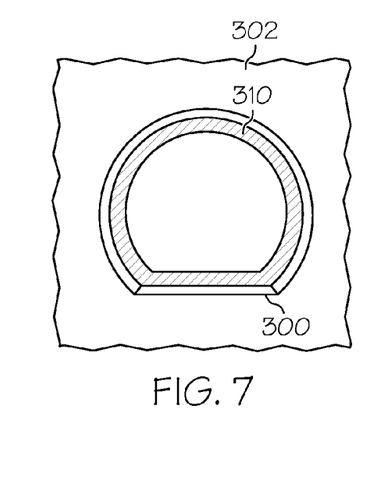
FIG. 7 is a cross-sectional view of a portion of the combustor section of FIG. 3 through line 4-4 in accordance with a further exemplary embodiment.

The embodiments shown in FIGS. 4-6 have regular shapes, although other, irregular shapes may also be provided. For example, in the embodiment shown in FIG. 7, the air admission hole 300 and insert 310 have cross-sectional shapes, each with a generally circular portion and a generally straight portion. Although FIGS. 4-7 illustrate embodiments in which the inner circumference of the insert 310 matches the outer circumference of the insert 310, in some embodiments, the inner circumference may be circular while the outer circumference may be shaped to prevent rotation with respect to the air admission hole 300.

The non-circular configuration of the air admission holes 300 and/or inserts 310 in FIGS. 4-7 mitigates or prevents rotation of the inserts 310 within the air admission holes 300. Rotation may result in undesirable wear at the interface between the liner material defining the air admission hole and the insert. However, preventing of such rotation may reduce such wear and thereby increase durability and performance without undue increases in cost or time.

In various embodiments, the air admission holes 300 may be formed by laser drilling, electrical discharge machining (EDM), or casting. The inserts 310 may be cast or machined into the desired shapes. Additionally, the inserts 310 may be swaged into a dimension that generally matches that of the air admission holes 300 during installation. One exemplary embodiment for installing an insert (e.g., insert 310 of FIG. 3) in a combustor liner (e.g., liner 302 of FIG. 3) is discussed below.

Figure 8:
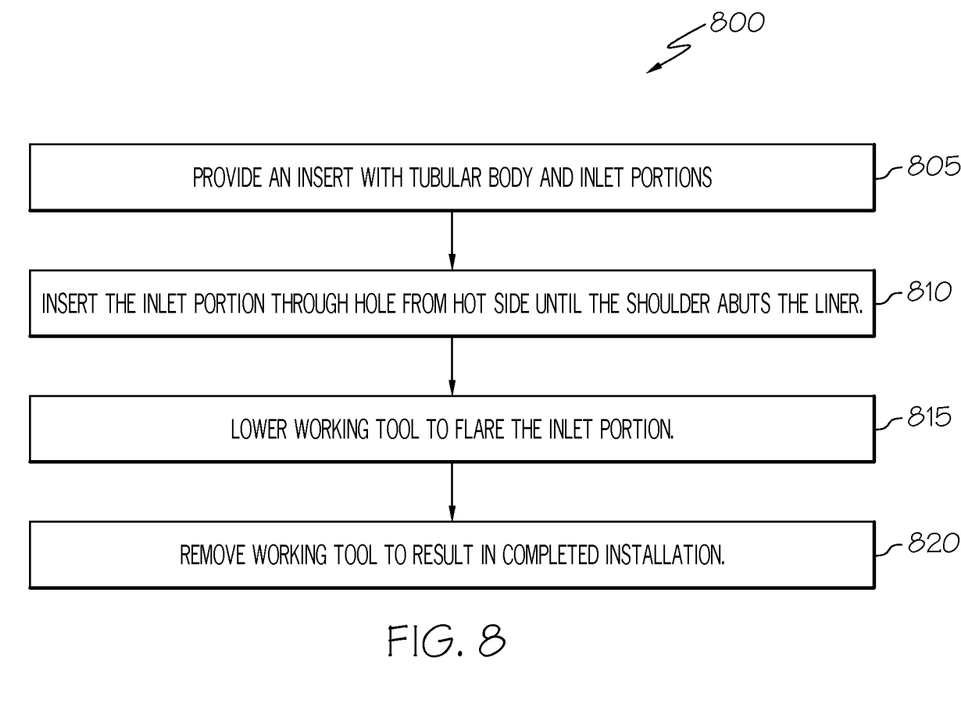
FIG. 8 is a flow chart of a method for installing inserts in a combustor liner in accordance with an exemplary embodiment.

FIG. 8 is a flow chart of a method 800 for installing an insert in a combustor liner, such as insert 310 in liner 302, in accordance with an exemplary embodiment. FIGS. 9-12 depict aspects of the method 800 and are referenced in the description of FIG. 8 below.

Figure 9:
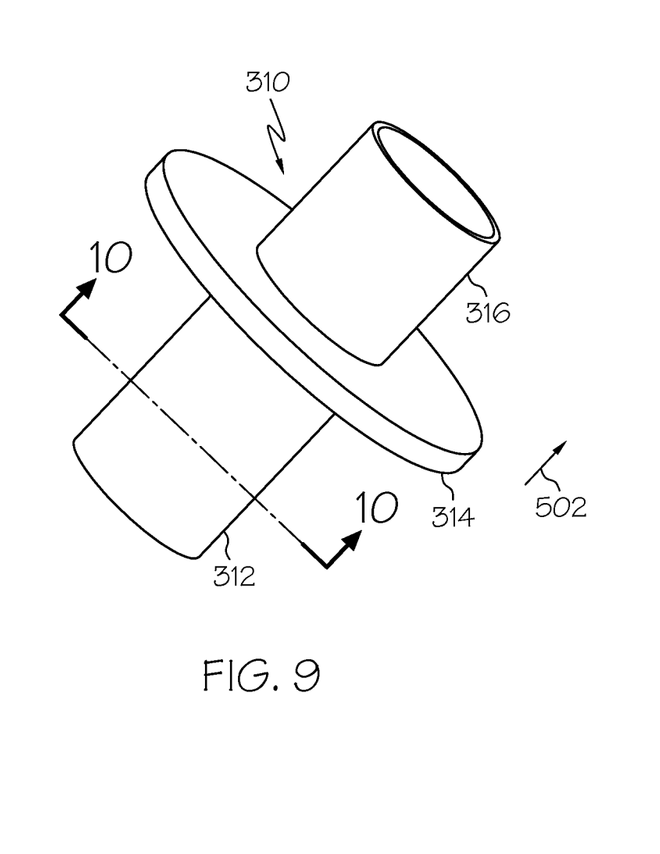
FIG. 9 is an isometric view of an insert prior to installation in the combustor section of FIG. 3 in accordance with an exemplary embodiment.
Figure 10:
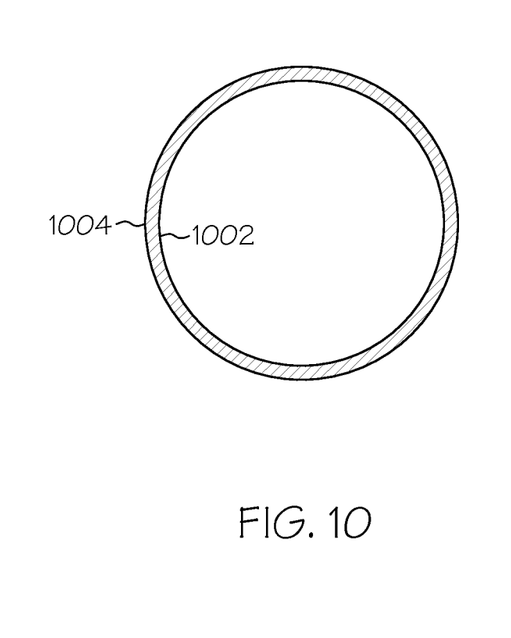
FIG. 10 is a cross-sectional view of the insert of FIG. 9 through line 10-10 in accordance with an exemplary embodiment.

In a first step 805 of the method 800, an insert 310 is provided. At this stage, the insert 310 is generally configured as depicted in FIG. 9 and includes the tubular body portion 312 and the shoulder 314 circumscribing the body portion 312. As also shown in FIG. 9, the inlet portion 316 in this step generally has a circumference equal to that of the body portion 312. In other words, the body portion 312 and the inlet portion 316 form a single tube shape with a generally constant diameter. In one exemplary embodiment, the body portion 312 of the insert 310 may have a circular cross-sectional shape, such as shown in FIG. 10, which is a cross-sectional view of the insert 310 through line 10-10 of FIG. 9. In this exemplary embodiment, the inner circumference 1002 of the insert 310 is circular and the outer circumference 1004 of the insert 310 is also circular.

Figure 11:
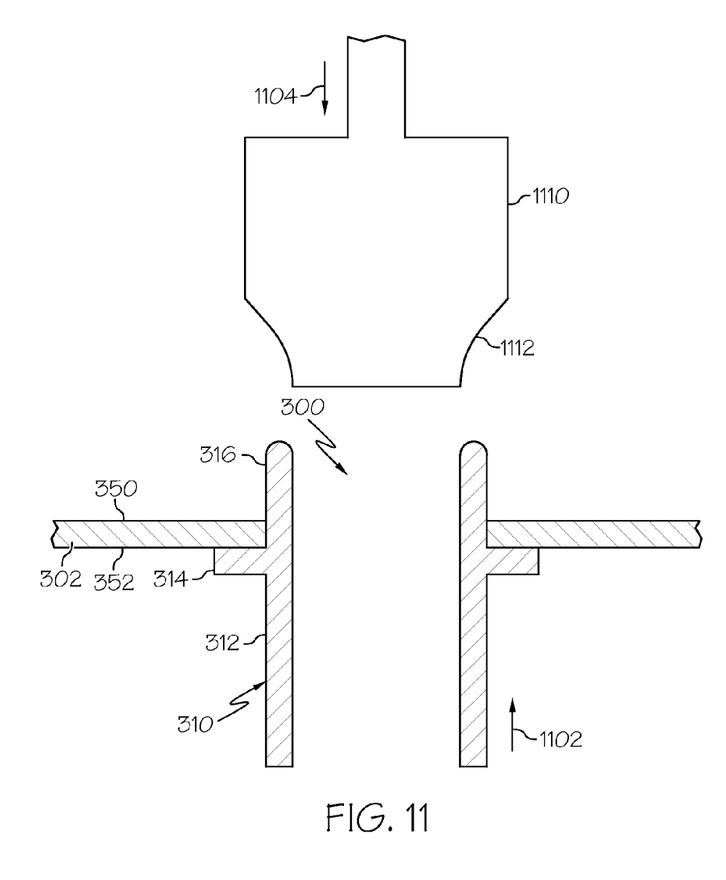
FIG. 11 is an enlarged portion of a combustor illustrating an installation step of the method of FIG. 8 in accordance with an exemplary embodiment.

In a second step 810, the inlet portion 316 is inserted through the air admission hole 300 of the liner 302 from the hot side 352 (i.e., in the direction 1102) until the shoulder 314 abuts the hot side 352, e.g., as shown in FIG. 11. The inlet portion 316, at this stage, may pass through the air admission hole 300 from the hot side 352 without obstruction until the shoulder 314 abuts the hot side 352.

Figure 12:
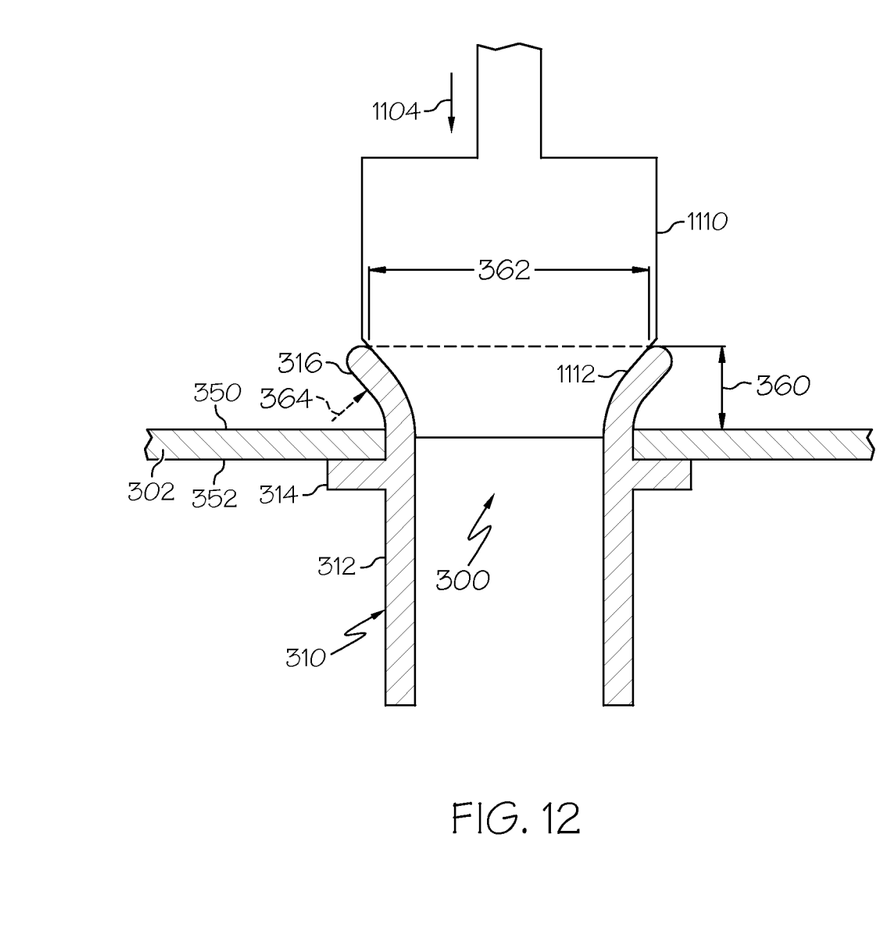
FIG. 12 is an enlarged portion of a combustor illustrating another installation step of the method of FIG. 8 in accordance with an exemplary embodiment.

In a step 815, a working tool 1110 is lowered in direction 1104 to flare the inlet portion 316, as is particularly shown in FIGS. 11 and 12. The working tool 1110 may be lowered, for example, in a machine press (not shown). The working tool 1110 has a contour 1112 that may generally match the final geometry of the inlet portion 316, including the height 360, diameter 362, and curvature 364 of the inlet portion 316. As such, the geometric configuration of the inlet portion 316 may be precisely controlled by the geometry of the working tool 1110. Given the contour 1112 and controlled precision of the working tool 1110, the deformation or flaring of the inlet portion 316 does not require a backing structure at the inlet portion 316 as a counter-force to the deformation. This facilitates installation. A counter-press may be provided at the shoulder 314 to maintain the position of the insert 310 relative to the liner 302 as the working tool 1110 deforms the inlet portion 316.

In one exemplary embodiment, the working tool 1110 functions to at least partially swage the outer diameter of the insert 310 into dimensions corresponding to the air admission hole 300. As such, using the examples discussed in FIGS. 4-6, after step 815, the insert 310 may have an outer diameter with a tri-lobe, hexagonal, knurled shape, or other non-circular configuration corresponding to the respective air admission hole 300. In a step 820, the working tool 1110 is removed from the insert 310 to result in the completed installation of the insert 310, such as shown in FIG. 3 and discussed above.

As also noted above, the flared inlet portion 316 and shoulder 314 cooperate to retain the insert 310 within the air admission hole 300 of the liner 302 without welding and without damage to any coatings on the liner 302 or the liner 302 itself. In particular, the insert 310 and air admission hole 300 are shaped to prevent relative rotation. The installation method 800 further provides a versatile insert design by accommodating different hole diameters, insert dimensions, and inlet portion profiles. The resulting configuration provides an insert 310 that enables enhanced durability and/or operation. Conventional single-walled combustors have no cold wall, conventional single-walled combustors typically do not use inserts since welding may yield undesirable thermal behavior. In contrast, exemplary embodiments discussed herein provide the advantages of inserts in single-walled combustors without the undesirable mounting issues.

Figure 13:
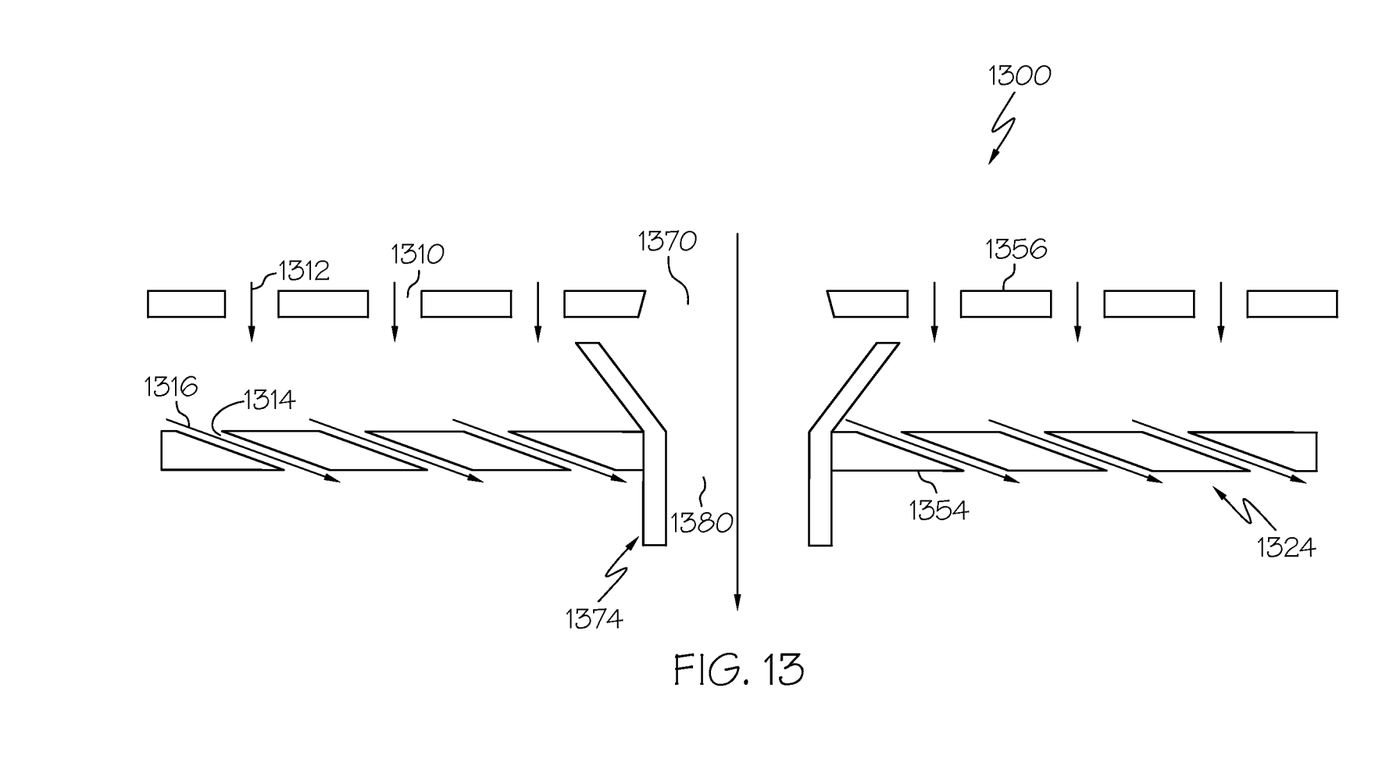
FIG. 13 is an enlarged portion of a combustor section in accordance with another exemplary embodiment.

Although the embodiments of FIGS. 2-12 refer to single-walled combustors, non-circular air admission holes may also be incorporated into double-walled combustors. FIG. 13 is an enlarged portion of a double-walled combustor 1300 that may be incorporated into the engine 100 of FIG. 1. FIG. 13 particularly depicts portions of a hot wall 1354 and a cold wall 1356 that may form part of a combustor liner 1324 (e.g., inner liner or outer liner) with impingement-effusion cooling. As such, the cold wall 1356 includes a number of impingement cooling holes 1310 that admit impingement jets 1312 of cooling air to the hot wall 1354. The impingement cooling holes 1310 are typically 90° to the surface of the cold wall 1356, although other arrangements are contemplated. The hot wall 1354 includes a number of effusion cooling holes 1314. The effusion cooling holes 1314 are relatively small, closely spaced holes serving to direct a flow 1316 of cooling air through the hot wall 1354. The effusion cooling holes 1314 are typically angled at, for example, 15°-45° to the surface of the hot wall 1354, and may be oriented to discharge at various angles relative to the bulk combustor gas flow, such that a film of cooling air forms on the hot wall 1354.

In this embodiment, an insert 1374 may be mounted in an air admission hole 1380 on the hot wall 1354. The insert 1374 and air admission holes 1380 may be similar to the inserts and air admission holes discussed above with reference to FIGS. 2-12. As such, the non-circular shape of the air admission hole 1380 prevents rotation of the insert 1374 within the air admission hole 1380 to reduce or mitigate wear that would otherwise result from such rotation.

The insert 1374 is geometrically configured to advantageously direct the jet 1372 from an orifice 1370 in the cold wall 1356, though the hot wall 1354, and into the combustion chamber. In some embodiments, the insert 1374 and orifice 1370 in the cold wall 1356 can be configured to meter the jet 1372 through the liner 1324. In other words, the geometry of the insert 1374 and orifice 1370 can be configured such that flow rate through the orifice 1370 is approximately equal to the flow rate through the insert 1374, and consequently the orifice 1370. In another embodiment, particularly one that includes a bellmouth, the flow rate through the orifice 1370 differs from the flow rate through insert 1374 by approximately ±10%.

Accordingly, exemplary embodiments discussed above provide combustors with inserts that enhance combustion in an RQL combustion process. Particularly, the inserts and/or combustion liners include anti-rotation features to prevent relative rotations such that durability and performance is improved.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
a first liner comprising a hot side and a cold side;
a second liner forming a combustion chamber with the first liner, the combustion chamber configured to receive an air-fuel mixture for combustion therein;
the first liner defining an air admission hole for directing a first jet of pressurized air into the combustion chamber, the air admission hole having a non-circular shape; and
an insert positioned within the air admission hole to guide the first jet through the air admission hole and into the combustion chamber, wherein the insert includes a shoulder abutting the hot side and a flared inlet portion abutting the cold side,
wherein the insert has an outer circumference swaged into the air admission hole such that the outer circumference of the insert matches the non-circular shape of the air admission hole.

2. The combustor of claim 1, wherein the air admission hole has a tri-lobe shape.

3. The combustor of claim 1, wherein the air admission hole has a hexagonal shape.

4. The combustor of claim 1, wherein the air admission hole has a knurled shape.

5. The combustor of claim 1, wherein the air admission hole has a shape with at least one straight portion and at least one curved portion.

6. A method for installing an insert in an air admission hole of a combustor liner, the insert including a body portion, a shoulder, and an inlet portion and the combustor liner having a liner wall with a first side and a second side, the method comprising the steps of:
inserting the inlet portion through the air admission hole from the first side to the second side until the shoulder abuts the hot side, wherein the air admission hole has a generally non-circular shape; and
deforming the inlet portion such that the inlet portion has an outer diameter greater than a diameter of the air admission hole such that the inlet portion and the shoulder capture the combustor liner to retain the insert relative to the air admission hole, wherein the deforming step includes swaging the body portion of the insert such that an outer circumference of the body portion matches the generally non-circular shape of the air admission hole.

7. The method of claim 6, wherein the air admission hole has a tri-lobe shape.

8. The method of claim 6, wherein the air admission hole has a hexagonal shape.

9. The method of claim 6, wherein the air admission hole has a knurled shape.

10. The method of claim 6, wherein the air admission hole has a shape with at least one straight portion.

11. The method of claim 6, wherein the first liner is a dual-walled liner with a hot wall and a cold wall, and wherein the air admission hole is defined in the hot wall.

12. The combustor of claim 1, wherein the first liner is a dual-walled liner with a hot wall and a cold wall, wherein the cold wall defines a plurality of impingement cooling holes to direct cooling air onto the surface of the hot wall, and wherein the air admission hole is defined in the hot wall.

13. The combustor of claim 12, wherein the air admission hole defined in the hot wall is a first air admission hole, and wherein the combustor further comprises a second air admission hole in the cold wall that is in fluid communication with the first air admission hole such that the first jet flows through the second air admission hole, then through the insert and the first air admission hole into the combustion chamber.

\* \* \* \* \*